(12) United States Patent
Madan et al.

(10) Patent No.: US 11,297,024 B1
(45) Date of Patent: Apr. 5, 2022

(54) CHAT-BASED SYSTEMS AND METHODS FOR DATA LOSS PREVENTION

(71) Applicant: Shoreline Labs, Inc., San Francisco, CA (US)

(72) Inventors: Isaac Abhay Madan, San Francisco, CA (US); Rohan Shrikant Sathe, San Francisco, CA (US)

(73) Assignee: Shoreline Labs, Inc., San Francisco, CA (US)

( * ) Notice: Subject to any disclaimer, the term of this patent is extended or adjusted under 35 U.S.C. 154(b) by 0 days.

(21) Appl. No.: 16/562,331

(22) Filed: Sep. 5, 2019

(51) Int. Cl.
| *H04L 51/18* | (2022.01) |
| *H04L 9/40* | (2022.01) |
| *H04L 12/18* | (2006.01) |
| *H04L 51/046* | (2022.01) |
| *H04L 29/06* | (2006.01) |

(52) U.S. Cl.
CPC .......... *H04L 51/18* (2013.01); *H04L 12/1813* (2013.01); *H04L 51/046* (2013.01); *H04L 63/104* (2013.01); *H04L 63/105* (2013.01)

(58) Field of Classification Search
None
See application file for complete search history.

(56) References Cited

U.S. PATENT DOCUMENTS

| 8,667,121 | B2 | | 3/2014 | Ahuja et al. | |
| 9,158,785 | B1 | * | 10/2015 | Rudkowski | H04L 67/1095 |
| 9,275,065 | B1 | * | 3/2016 | Ganesh | G06F 21/604 |
| 9,716,724 | B1 | * | 7/2017 | Chennuru | H04L 63/1433 |
| 10,417,613 | B1 | * | 9/2019 | Brisebois | G06Q 10/1095 |
| 10,817,619 | B1 | * | 10/2020 | Kolli | H04L 63/0807 |
| 2009/0293121 | A1 | * | 11/2009 | Bigus | G06F 21/316 |
| | | | | | 726/22 |
| 2010/0218030 | A1 | * | 8/2010 | Bhatnagar | G06F 11/0748 |
| | | | | | 714/2 |
| 2013/0074193 | A1 | * | 3/2013 | Baker | G06F 21/6218 |
| | | | | | 726/28 |
| 2015/0127489 | A1 | * | 5/2015 | Vasthimal | G06Q 50/01 |
| | | | | | 705/26.62 |
| 2015/0269386 | A1 | * | 9/2015 | Khetawat | G06F 21/62 |
| | | | | | 726/1 |
| 2016/0132812 | A1 | * | 5/2016 | Beasley | G06Q 10/06393 |
| | | | | | 705/7.39 |
| 2017/0329972 | A1 | * | 11/2017 | Brisebois | G06F 21/6218 |

(Continued)

OTHER PUBLICATIONS

Rich Mogull, Best Practices for Endpoint Data Loss Prevention (Year: 2012).*

(Continued)

*Primary Examiner* — Lance Leonard Barry
*Assistant Examiner* — Mohammad Yousuf A. Mian
(74) *Attorney, Agent, or Firm* — Nicholson De Vos Webster & Elliott LLP (57) ABSTRACT

Chat-based systems and methods for data loss prevention are described. In one embodiment, a method includes receiving an enable command from a chat service by a data loss prevention service, scanning data from a data source with the data loss prevention service in response to the enable command to detect private information in the data, generating an alert for the private information by the data loss prevention service, and sending the alert to the chat service to cause the chat service to broadcast a chat alert to a group of users.

20 Claims, 10 Drawing Sheets

(56) References Cited

U.S. PATENT DOCUMENTS

2017/0372070 A1* 12/2017 Burdett ................. G06F 21/565
2019/0197479 A1* 6/2019 Huang .................... H04L 51/34

OTHER PUBLICATIONS

GitHub, "Get Started with Github Enterprises—The World's Leading Software Development Platform," 2019, retrieved from the Internet: https://github.com on Aug. 20, 2019, 10 pages.

GitHub, "GitHub—awslabs/git-secrets: Prevents You from Committing Secrets and Credentials into Git Repositories," 2019, retrieved from the Internet: https://github.com/awslabs/git-secrets on Aug. 20, 2019, 9 pages.

GitHub, "GitHub—dxa4481/truffleHog: Searches Through Git Repositories for High Entropy Strings and Secrets, Digging Deep in to Commit History," 2019, retrieved from the Internet: https://github.com/dxa4481/truffleHog on Aug. 20, 2019, 4 pages.

GitHub, "GitHub—michenriksen/gitrob: Reconnaissance Tool for GitHub Organizations," 2019, retrieved from the Internet: https://github.com/michenriksen/gitrob on Aug. 20, 2019, 3 pages.

GitHub, "GitHub—Zricethezav/gitleaks: Audit Git Repos for Secrets," 2019, retrieved from the Internet: https://github.com/zricethezav/gitleaks on Aug. 20, 2019, 5 pages.

Gitlab, "A Full Devops Tool Chain—The First Single Application for the Entire Devops Lifecycle," 2019, retrieved from the Internet: https://about.gitlab.com on Aug. 20, 2019, 10 pages.

Slack, "Whatever Work You Do, You Can Do it in Slack," 2019, retrieved from the Internet: https://slack.com on Aug. 30, 2019, 205 pages.

* cited by examiner

SENSITIVE FILE DETECTED 300

HI, WE NOTICED YOU SENT A FILE THAT MAY CONTAIN PRIVATE INFORMATION (DETAILS BELOW). PLEASE DOUBLE CHECK IF YOU INTENDED TO SEND THIS FILE, AND IF NOT, PLEASE DELETE IT. NOTE THAT IT MAY HAVE ALREADY BEEN DELETED AUTOMATICALLY OR BY AN ADMINISTRATOR.

WHERE: #GENERAL (GO TO FILE)   WHEN: MONTH, DAY, YEAR AT TIME

FILENAME: CREDIT_CARDS.XLSX

FIG. 3

SENSITIVE MESSAGE DETECTED 400

HI, WE NOTICED YOU SENT A MESSAGE THAT MAY CONTAIN PRIVATE INFORMATION (DETAILS BELOW). PLEASE DOUBLE CHECK IF YOU INTENDED TO SEND THIS MESSAGE, AND IF NOT, PLEASE DELETE IT. NOTE THAT IT MAY HAVE ALREADY BEEN DELETED AUTOMATICALLY OR BY AN ADMINISTRATOR.

WHERE: #GENERAL (GO TO MESSAGE)   WHEN: MONTH, DAY, YEAR AT TIME

SNIPPET: MY ID IS AK * * * * * * * * * * * * * * * * * * * * * * * * * * * * *

FIG. 4

USER INTERFACE 502

MESSAGES

DLP FOR CHAT APP

THIS IS THE VERY BEGINNING OF YOUR DIRECT MESSAGE HISTORY WITH DLP FOR CHAT

— TODAY —

TIME:

SENSITIVE FILE DETECTED

HI, WE NOTICED YOU SENT A FILE THAT MAY CONTAIN PRIVATE INFORMATION (DETAILS BELOW). PLEASE DOUBLE CHECK IF YOU INTENDED TO SEND THIS FILE, AND IF NOT, PLEASE DELETE IT. NOTE THAT IT MAY HAVE ALREADY BEEN DELETED AUTOMATICALLY OR BY AN ADMINISTRATOR.

WHERE: #GENERAL (GO TO FILE)    WHEN: MONTH, DAY, YEAR AT TIME

FILENAME: CREDIT_CARDS.XLSX

TIME:

SENSITIVE MESSAGE DETECTED

HI, WE NOTICED YOU SENT A MESSAGE THAT MAY CONTAIN PRIVATE INFORMATION (DETAILS BELOW). PLEASE DOUBLE CHECK IF YOU INTENDED TO SEND THIS MESSAGE, AND IF NOT, PLEASE DELETE IT. NOTE THAT IT MAY HAVE ALREADY BEEN DELETED AUTOMATICALLY OR BY AN ADMINISTRATOR.

WHERE: #GENERAL (GO TO MESSAGE)    WHEN: MONTH, DAY, YEAR AT TIME

SNIPPET: MY ID IS AK * * * * * * * * * * * * * * * * * * * * * * * * * * * * * *

Sidebar:

○ USER_1

Q THREADS

CHANNELS
GENERAL
RANDOM
+ ADD A CHANNEL

DIRECT MESSAGES
◇ CHATBOT
○ USER_1 (YOU)  ⎫
○ USER_9         ⎬ 504
○ USER_55        ⎭
+ ADD PEOPLE

APPS
○ DLP FOR CHAT 506
+ ADD APPS

CHAT-BASED SYSTEMS AND METHODS FOR DATA LOSS PREVENTION

BACKGROUND

Computer networks have become indispensable tools for modern business. Enterprises can use networks for communications and, further, can store data in various forms and at various locations.

BRIEF DESCRIPTION OF DRAWINGS

Various embodiments in accordance with the present disclosure will be described with reference to the drawings, in which.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Information frequently propagates over a network of a business enterprise. An enterprise may be subject to one or more standards or regulations for protecting private information, such as, but not limited to, Payment Card Industry (PCI) standards (e.g., PCI Data Security Standards (PCI DSS)), General Data Protection Regulations (GDPRs) of the European Union, privacy requirements for protected health information under Health Insurance Portability and Accountability Act (HIPAA), privacy requirements for financial data under Sarbanes-Oxley Act (SOX). Private information may include one or any combination of: personally identifiable information (e.g., phone number, email address, person name (e.g., first and/or last name), location, credit card number, and/or age), identification numbers (e.g., driver's license number, taxpayer number, passport number, US social security number, vehicle identification number, and/or vehicle license plate number), finance information (e.g., international bank account number (IBAN), Society for Worldwide Interbank Financial Telecommunication (SWIFT) code, Committee on Uniform Security Identification Procedures (CUSIP) code, and/or routing numbers), health information (e.g., International Classification of Diseases (ICD) codes, US Food and Drug Administration (FDA) information, Drug Enforcement Administration (DEA) information, and/or National Provider Identifier (NPI) number), network information (e.g., Internet Protocol address (IP address), hardware ID, and/or media access control address (MAC address)), cryptographic information (e.g., cryptocurrency information and/or encryption information, such as, but not limited to, private keys), and/or any custom private information desired to be searched (e.g., business critical information, application programming interface (API) keys, and/or universally unique identifiers (UUIDs)). In certain embodiments, private information is (e.g., inadvertently) stored into a repository hosting provider (such as GitHub or GitLab) that socializes software development, making it easier to collaborate on projects and ship code quickly. Certain embodiments of a data loss prevention (DLP) service herein include a detector to detect private information, e.g., the private information discussed herein.

However, certain embodiments of a data loss prevention service requires users (e.g., administrator or administrators) to (e.g., repeatedly) log into a user interface (e.g., dashboard) of the DLP service (e.g., for each instance of private information that is detected), for example, to view (i) information about the private information (e.g., who created the data that includes the detected private information, when it was created, file name, and/or file location (e.g., Uniform Resource Locator (URL)), (ii) a record of any action(s) taken, and/or (iii) possible action(s) to take.

An action may be a notification sent to one or more users (e.g., the creator of the data that includes the private information). An action may be a corrective action, for example, quarantining the data that includes the private information, deleting the data that includes the private information, redacting the data that includes the private information, and/or changing access permission for the data that includes the private information (e.g., to prevent access to the data by certain users).

In certain embodiments, an indication that private information is detected is sent via email and the user (e.g., administrator) is to log into the user interface (e.g., dashboard) of the data loss prevention service to begin acting on the private information. However, requiring the user or users (e.g., administrator or administrators) to utilize a user interface (e.g., dashboard) of the data loss prevention service requires that administrator to be logged into the user interface in certain embodiments. If numerous instances of private information are detected and/or numerous data sources/users are being monitored, the data loss prevention service user (e.g., administrator) may be logging into the data loss prevention service countless times each day.

Embodiments herein are directed to a chat service that enables use of a DLP service (e.g., tool) without the data loss prevention service user (e.g., administrator) logging into the DLP service because the DLP service sends an (e.g., private information) alert to the chat service to cause the chat service to broadcast a chat alert to a user or a group of users (e.g., a group of people who are to be alerted to the private information, which may include, but is not limited to, the creator of the data including private information, the information technology (IT) administrator(s), the supervisor(s) of the creator (e.g., transmitter and/or uploader) of the data including private information, etc.). The DLP service sending an alert to the chat service to cause the chat service to broadcast a chat alert to a user or a group of users also allows for a notification to the user or the group of users without granting them access to the data loss prevention service itself (e.g., to the user interface (e.g., dashboard) of the DLP service).

Multiple users (e.g., administrators) may be logged into the DLP service (e.g., user interface) as the same time, and multiple administrators may be attempting to simultaneously act on the private information without knowledge of the other administrator(s) doing the same. Embodiments herein are directed to a chat service that enables use of a DLP service (e.g., tool) without multiple data loss prevention service users (e.g., administrators) logging into the DLP service because the DLP service sends an (e.g., private information) alert to the chat service to cause the chat service to broadcast a chat alert to a group of users (e.g., not via email). The chat alert may include a confirmation that action has begun to be taken on the data including the private information, e.g., as discussed below. The DLP service sending an alert to the chat service to cause the chat service to broadcast a chat alert to the group of users also allows for a notification to the group of users without granting all of them access to the data loss prevention service (e.g., user interface (e.g., dashboard) of the DLP service).

In addition to allowing multiple users to send real-time messages between a sender and one or more recipients, a chat service may also allow the transfer of files (e.g., documents) within the chat service (e.g., not using email). Certain embodiments herein are directed to a chat service that enables use of a DLP service (e.g., tool) to scan messages sent between users of the service for private information, e.g., and the DLP service sends an (e.g., private information) alert to the chat service to cause the chat service to broadcast a chat alert to a user or a group of users (e.g., a group of people who are to be alerted to the private information, which may include, but is not limited to, the sender and/or creator of the data including private information, the information technology (IT) administrator(s), the supervisor(s) of the sender and/or creator of the message including private information, etc.).

Figure 1:
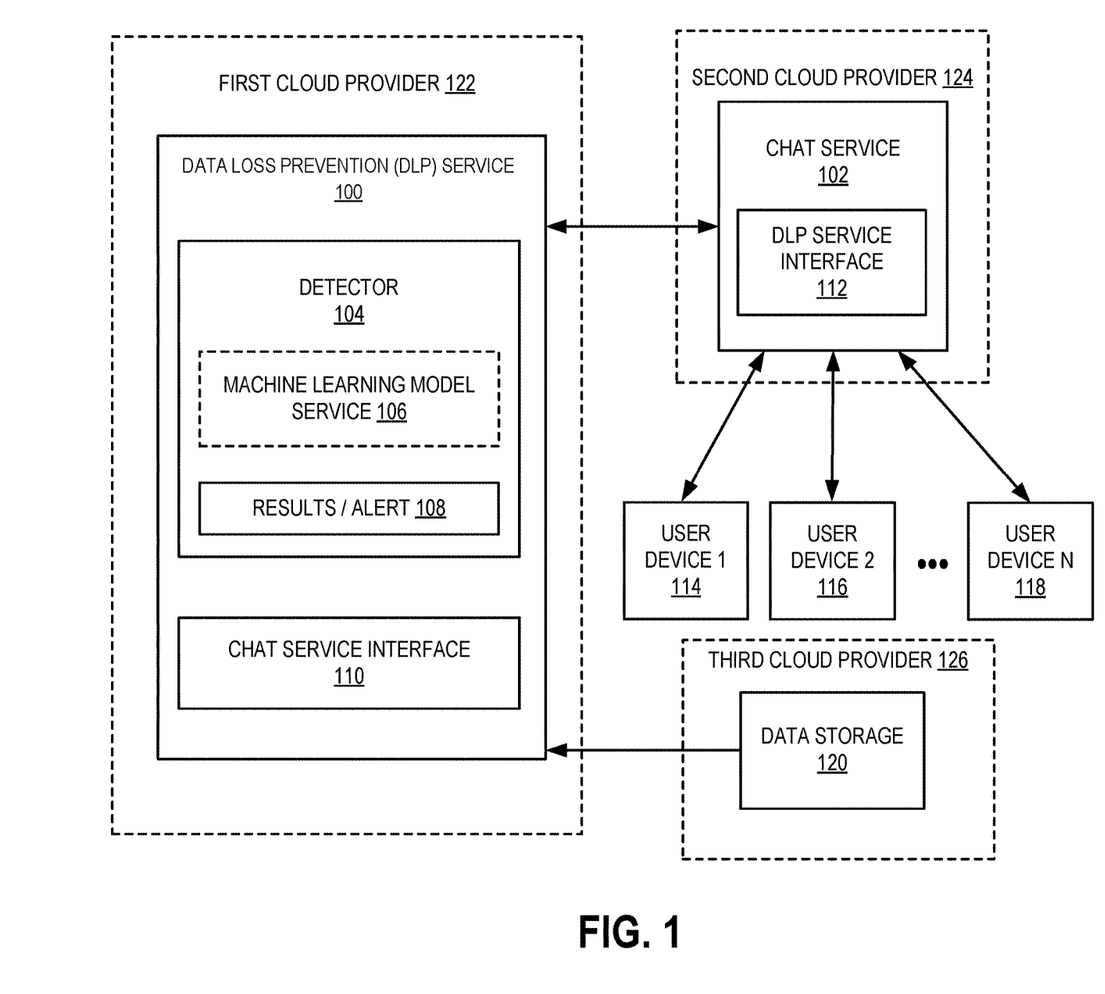
FIG. 1 is a diagram illustrating an environment including a data loss prevention service having a detector in a first cloud provider coupled to a chat service in a second cloud provider to enable detection of private information in data storage in a third cloud provider according to embodiments of the disclosure.

FIG. 1 is a diagram illustrating an environment including a data loss prevention service 100 having a detector 104 (optionally, in a first cloud provider 122) coupled to a chat service 102 (optionally, in a second cloud provider 124) to enable detection of private information in data storage 120 (optionally, in a third cloud provider 126) according to embodiments of the disclosure. In one embodiment, a cloud provider is a network that provides a storage service and a hardware virtualization service. Depicted data loss (DLP) prevention service 100 includes a detector to detect private information. Detector 104 includes an optional machine learning model service 106. In one embodiment, machine learning model service 106 trains a machine learning model on a set of known (e.g., private) information (e.g., training data) to create the machine learning model that detects (e.g., not known) private information. Detector 104 scans data (e.g., data from data storage 120) to determine if the data includes any private information (e.g., private information as indicated by machine learning model from machine learning model service 106). Detector 104 creates an alert 108 for private information that is detected. In one embodiment, alert 108 includes a list of the results, e.g., including identifying the creator/sender of the data including private information, a day/time stamp (e.g., the day/time the data including private information was sent and/or uploaded), the location of the data (e.g., URL for a file that includes private information), and/or snippet of the data (e.g., a snippet of a chat message that includes private information). Data loss prevention service 100 includes a chat service interface 110, e.g., to send alert 108 from detector 104 to chat service 102 to send and receive messages with DLP service interface 112 in chat service 102.

In certain embodiments, chat service 102 allows multiple user devices (e.g., user device 1 114, user device 2 116, user device N 118, where N is a positive integer of 3 or greater) to send real-time messages from a sender to one or more recipients. Chat service 102 may allow the transfer of files by user devices (e.g., at the direction of the user operating a device) to other user device or devices. In certain embodiments, chat service 102 is hosted in second cloud provider 124, e.g., in contrast to being entirely resident on user devices. Chat service 102 includes a data loss prevention (DLP) service interface 112 to send and receive messages with chat service interface 110 in DLP service 100.

As one configuration example, a user of chat service 102 (e.g., administrator of chat service 102 and/or DLP service 100) sends a (e.g., enable command) message to chat service 102 to enable monitoring of data for private information. In one embodiment, this message includes what to monitor (e.g., data storage 120 location) and who to send chat alerts (e.g., chat messages) to with status updates. In certain embodiments, this message causes DLP service interface 112 (e.g., loaded into chat service 102) to send a resulting message to chat service interface 110 (e.g., interface 110 loaded into DLP service 100) to cause DLP service 100 to configure itself to enable monitoring of data for private information, e.g., and to generate a requested alert 108 (e.g., with the desired information to include as results).

As another configuration example, a user (e.g., administrator) logs into (e.g., dashboard of) chat service 102 and enables DLP service interface 112, for example, with the enabling causing the DLP service interface 112 to send a resulting message to chat service interface 110 (e.g., interface 110 loaded into DLP service 100) to cause DLP service 100 to configure itself to enable monitoring of data for private information, e.g., and to generate a requested alert 108 (e.g., with the desired information to include as results).

In certain embodiments, a user (e.g., administrator) logs into (e.g., dashboard of) DLP service 100 and enables chat service interface 110, for example, with the enabling allowing communication by chat service interface 110 with DLP service interface 112 of chat service 102.

Figure 2:
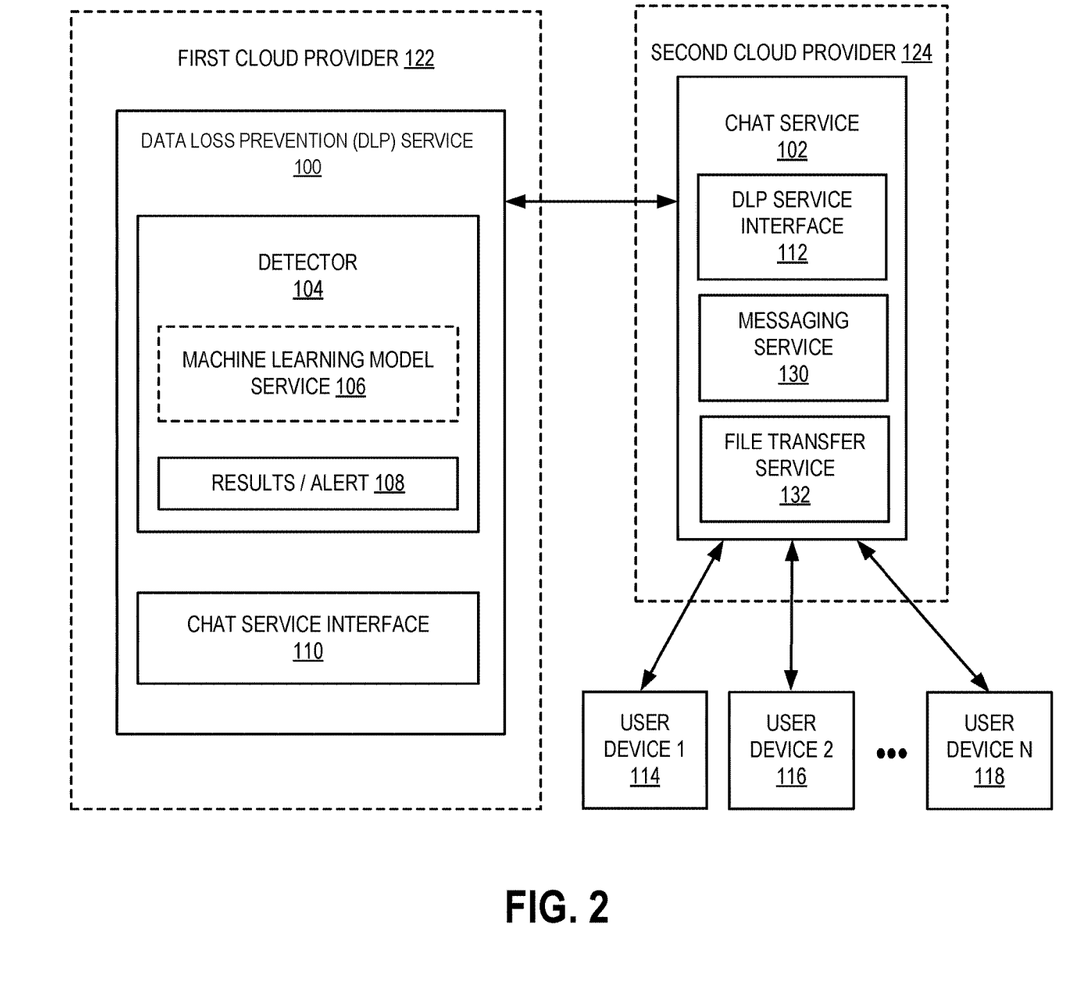
FIG. 2 is a diagram illustrating an environment including a data loss prevention service having a detector in a first cloud provider coupled to a chat service in a second cloud provider to enable detection of private information within a messaging service and/or a file transfer service of the chat service according to embodiments of the disclosure.

After configuration, in certain embodiments, detector 104 is to continuously monitor the indicated data (e.g., locations and/or channels) for private information that may be flowing into and/or out of files in data storage 120 (e.g., and monitor messages as discussed further in reference to FIG. 2). In one embodiment, the configuration causes a pull of data from data storage 120 into DLP service 100 for scanning. In one embodiment, the configuration causes a push of data from data storage 120 into DLP service 100 for scanning, e.g., for each time that the monitored data in data storage 120 changes.

In one embodiment, detector 104 classifies the private information (e.g., as personally identifiable information, identification numbers, finance information, or other private information types). In certain embodiments, once private information is detected, an alert 108 is generated by detector 104, and, triggered by alert 108, the chat service interface 110 is to send the alert (e.g., including the particular information discussed herein for that detected private information) to DLP service interface 112 to cause chat service 102 to broadcast a chat alert to one or more users that are to be updated (e.g., as indicated in the configuration for this monitoring). In certain embodiments, a chat alert for detected private information includes information that identifies the private information. In certain embodiments, a chat alert for detected private information includes a graphical user interface button to cause a corrective action to be taken for the private information when selected by a user (e.g., administrator). A corrective action may include: quarantining, deleting, displaying a visual alert to a user, coaching, etc. Corrective action may be automated (e.g., on detection of private information) or may be triggered by a user (e.g., administrator). The data being monitored may be in data storage 120 as in FIG. 1 or may be a message and/or a file sent by a user within a chat service.

FIG. 2 is a diagram illustrating an environment including a data loss prevention service 100 having a detector 104 (e.g., optionally, in a first cloud provider 122) coupled to a chat service 102 (e.g., optionally, in a second cloud provider 124) to enable detection of private information within a messaging service 130 and/or a file transfer service 132 of the chat service 102 according to embodiments of the disclosure. Messaging service 130 is to send a message or messages between a first user (e.g., initially transmitting user) and one or more (e.g., a plurality of) other users (e.g., initially receiving users), e.g., via user device 1 114, user device 2 116, or user device N 118. File transfer service 132 is to send a file or files from a first user (e.g., transmitting user) to one or more (e.g., a plurality of) other users (e.g., receiving users), e.g., via user device 1 114, user device 2 116, or user device N 118.

In one embodiment, a cloud provider is a network that provides a storage service and a hardware virtualization service. Depicted data loss (DLP) prevention service 100 includes a detector to detect private information. Detector 104 includes an optional machine learning model service 106. In one embodiment, machine learning model service 106 trains a machine learning model on a set of known (e.g., private) information (e.g., training data) to create the machine learning model that detects (e.g., not known) private information. Detector 104 scans data (e.g., data sent between users) to determine if the data includes any private information (e.g., private information as indicated by machine learning model from machine learning model service 106). Detector 104 creates an alert 108 for private information that is detected. In one embodiment, alert 108 includes a list of the results, e.g., including identifying the creator/sender of the data including private information, a day/time stamp (e.g., the day/time the data including private information was sent and/or uploaded), the location of the data (e.g., URL for a file that includes private information), and/or snippet of the data (e.g., a snippet of a chat message that includes private information). Data loss prevention service 100 includes a chat service interface 110, e.g., to send alert 108 from detector 104 to chat service 102 to send and receive messages with DLP service interface 112 in chat service 102.

In certain embodiments, chat service 102 allows multiple user devices (user device 1 114, user device 2 116, user device N 118, where N is a positive integer of 3 or greater) to send real-time messages from a sender to one or more recipients. Chat service 102 may allow the transfer of files by user devices (e.g., at the direction of the user operating the device) to other user device or devices. In certain embodiments, chat service 102 is hosted in second cloud provider 124, e.g., in contrast to being entirely resident on user devices. Chat service 102 includes a data loss prevention (DLP) service interface 112 to send and receive messages with chat service interface 110 in DLP service 100.

As one configuration example, a user of chat service 102 (e.g., administrator of chat service 102 and/or DLP service 100) sends a (e.g., enable command) message to chat service 102 to enable monitoring of data for private information. In one embodiment, this message includes what to monitor (e.g., which users and/or user devices to monitor) and who to send chat alerts (e.g., chat message) to with status updates. In certain embodiments, this message causes DLP service interface 112 (e.g., loaded into chat service 102) to send a resulting message to chat service interface 110 (e.g., loaded into DLP service 100) to cause DLP service 100 to configure itself to enable monitoring of data for private information, e.g., and to generate a requested alert 108 (e.g., with the desired information to include as results).

As another configuration example, a user (e.g., administrator) logs into (e.g., dashboard of) chat service 102 and enables DLP service interface 112, for example, with the enabling causing the DLP service interface 112 to send a resulting message to chat service interface 110 (e.g., loaded into DLP service 100) to cause DLP service 100 to configure itself to enable monitoring of data for private information, e.g., and to generate a requested alert 108 (e.g., with the desired information to include as results).

In certain embodiments, a user (e.g., administrator) logs into (e.g., dashboard of) DLP service 100 and enables chat service interface 110, for example, with the enabling allowing communication by chat service interface 110 with DLP service interface 112 of chat service 102.

After configuration, in certain embodiments, detector 104 is to continuously monitor the indicated data (e.g., within messaging service and/or file transfer service) for private information that may be flowing into and out of user devices (e.g., messages and/or files being transferred). In one embodiment, the configuration causes a pull of data (e.g., messages) between users into DLP service 100 for scanning. In one embodiment, the configuration causes a push of data (e.g., messages) between users into DLP service 100 for scanning, e.g., for each time that a message is sent.

In one embodiment, detector 104 classifies the private information (e.g., as personally identifiable information, identification numbers, finance information, or other private information types). In certain embodiments, once private information is detected, an alert 108 is generated by detector 104, and, triggered by the alert, the chat service interface 110 is to send the alert (e.g., including the particular information discussed herein for that detected private information) to DLP service interface 112 to cause chat service 102 to broadcast a chat alert to one or more users that are to be updated (e.g., as indicated in the configuration for this monitoring). In certain embodiments, a chat alert for detected private information includes information that identifies the private information. In certain embodiments, a chat alert for detected private information includes a graphical user interface button to cause a corrective action to be taken for the private information when selected by a user (e.g., administrator). A corrective action may include: quarantining, deleting, visual alerts, coaching, etc. Corrective action may be automated (e.g., on detection of private information) or may be triggered by a user (e.g., administrator).

Figure 3:
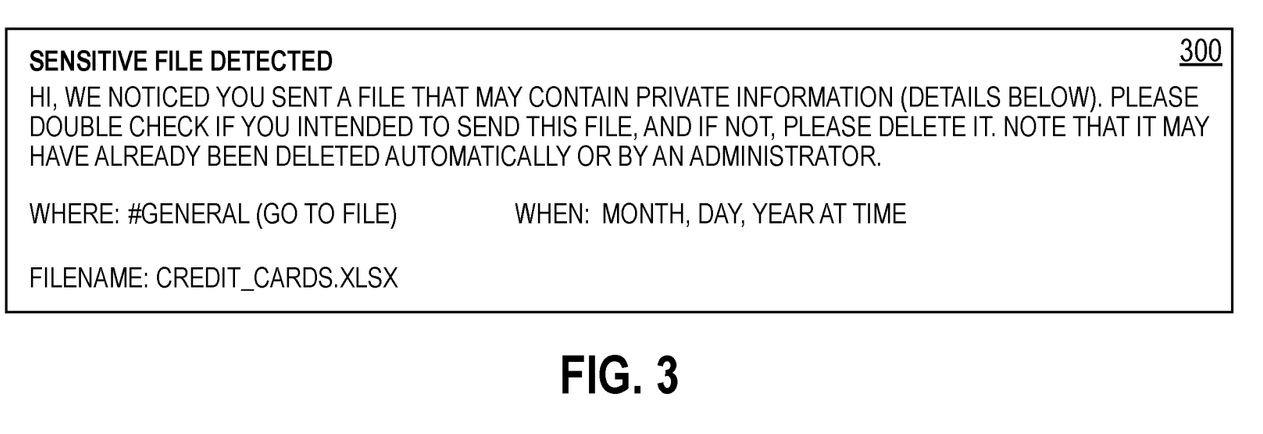
FIG. 3 is a diagram illustrating a chat alert that indicates detection of a file including private information by a data loss prevention service according to embodiments of the disclosure.

FIG. 3 is a diagram illustrating a chat alert 300 that indicates detection of a file including private information by a data loss prevention service according to embodiments of the disclosure. In certain embodiments, chat alert 300 is sent (e.g., by chat service 102 in FIG. 1 or FIG. 2) on detection of private information (e.g., by detector 104 in FIG. 1 or FIG. 2). In one embodiment, chat alert 300 is for a file that was sent by a first chat user (e.g., sent from user device 114) to one or more second chat users (e.g., sent to user device 116 or user device 118) that includes information that includes (e.g., or is likely to include) private information, e.g., with the chat alert being sent to the first chat user. A similar message may be sent to the one or more second chat users (e.g., with the phrase "sent a file" replaced with "received a file" and the phrase "send this file" replaced with "receive this file"). The text listed is an example and this field is customizable in certain embodiments. Depicted chat alert 300 includes a location ("Where") field that indicates where the file is located (e.g., and includes a link to that file), time ("When") that the private information was detected, and a file name ("Filename") to identify the file.

Figure 4:
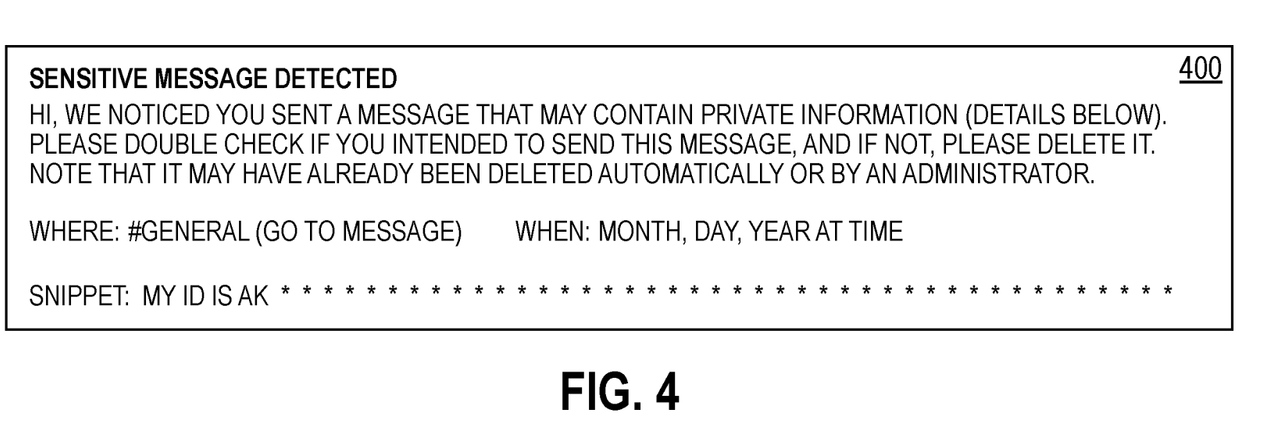
FIG. 4 is a diagram illustrating a chat alert that indicates detection of a message between chat users that includes private information by a data loss prevention service according to embodiments of the disclosure.

FIG. 4 is a diagram illustrating a chat alert 400 that indicates detection of a message between chat users that includes private information by a data loss prevention service according to embodiments of the disclosure. In certain embodiments, chat alert 400 is sent (e.g., by chat service 102 in FIG. 1 or FIG. 2) on detection of private information (e.g., by detector 104 in FIG. 1 or FIG. 2). In one embodiment, chat alert 400 is for the text of a chat message that was sent by a first chat user (e.g., sent from user device 114) to one or more second chat users (e.g., sent to user device 116 or user device 118) that includes information that includes (e.g., or is likely to include) private information, e.g., with the chat alert being sent to the chat user that sent the message. A similar message may be sent to the one or more second chat users (e.g., with the phrase "sent a message" replaced with "received a message" and the phrase "send this message" replaced with "receive this message"). The text listed is an example and this field is customizable in certain embodiments. Depicted chat alert 400 includes a location ("Where") field that indicates where the message is located (e.g., and includes a link to that message if messages are being retained), time ("When") that the private information was detected, and an identifier (e.g., snippet) to identify the message. In one embodiment, the snippet includes a redacted version of the private information that was within the message, e.g., along with some adjacent text to the private information.

Figure 5:
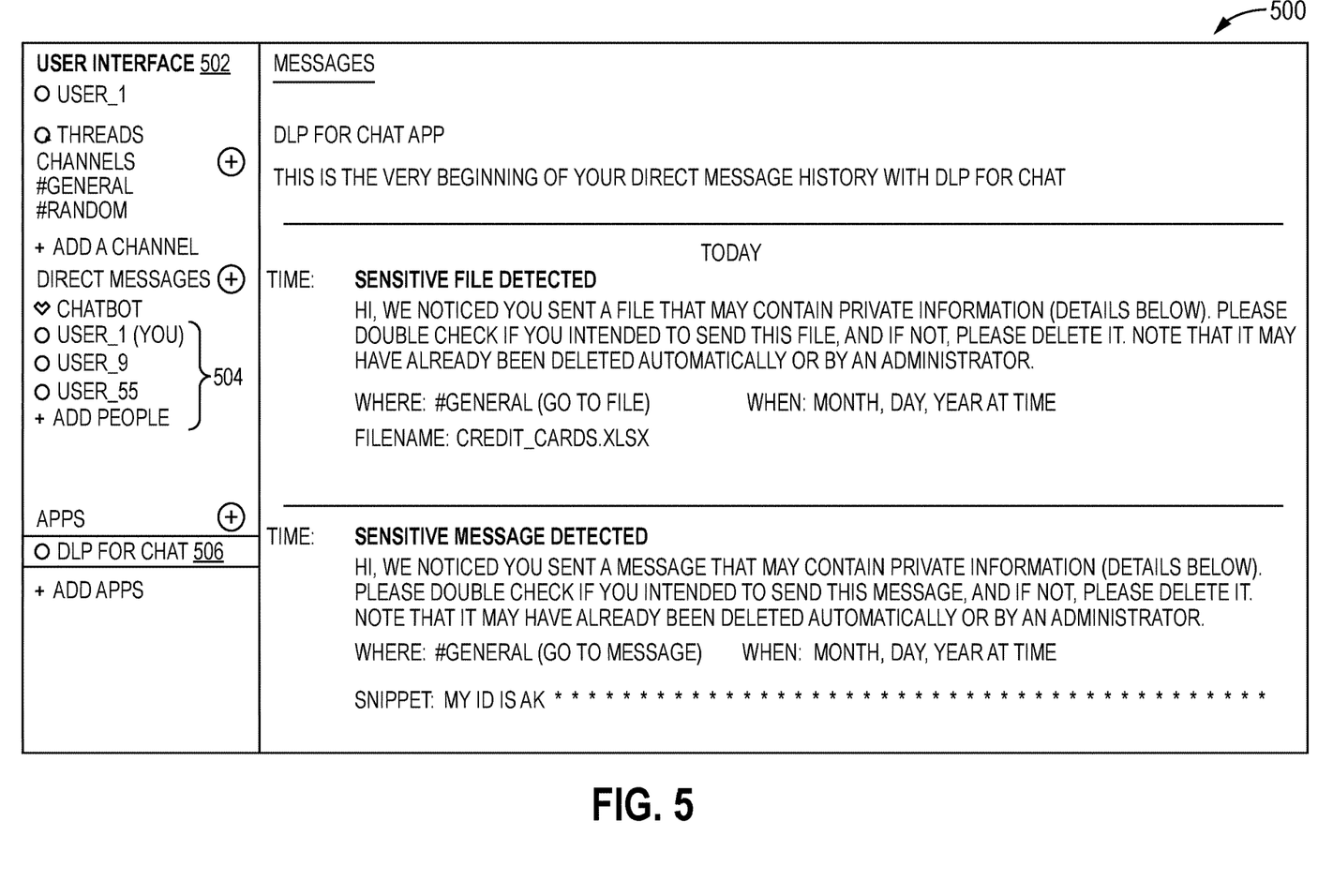
FIG. 5 is a diagram illustrating a chat alert history of chat alerts caused to be sent by a data loss prevention service according to embodiments of the disclosure.

FIG. 5 is a diagram illustrating a chat alert history 500 of chat alerts 300, 400 caused to be sent by a data loss prevention service according to embodiments of the disclosure. Chat alert history 500 may be displayed to an administrator, e.g., by logging into user interface 502. In one embodiment, user interface 502 is a graphical user interface of chat service 102. In one embodiment, chat alert history 500 displays each chat alert sent, e.g., by clicking DLP for chat button 506 on user interface 502. In one embodiment, user interface 502 allows a particular user to be selected (e.g., by clicking a button 504 including text with their user name) and then displays the particular, direct chat alert history 500 for chat alerts that involve (e.g., were sent and/or created by) that user.

Figure 6:
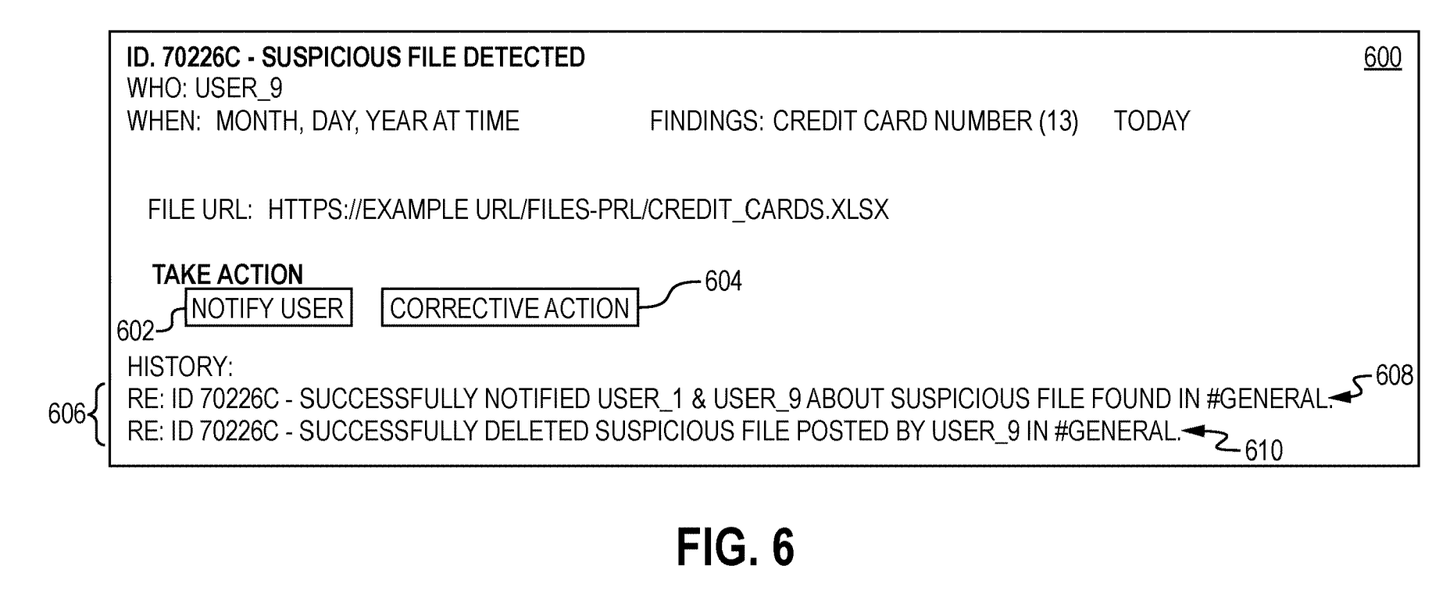
FIG. 6 is a diagram illustrating a summary that indicates the chat alerts sent and corrective action taken for a transmitted file that includes private information detected by a data loss prevention service according to embodiments of the disclosure.

FIG. 6 is a diagram illustrating a summary 600 that indicates the chat alerts sent and corrective action taken for a transmitted file that includes private information detected by a data loss prevention service according to embodiments of the disclosure. In one embodiment, summary 600 for chat alerts sent and corrective action taken is sent to a user (e.g., administrator) as a chat message (e.g., a chat alert that includes the information shown in FIG. 6). Summary 600 includes an ID number for the matter, the user ("Who") that transmitted the file that includes private information, a summary of findings (e.g., the type of private information, including, but not limited to, personally identifiable information, identification numbers, finance information, or other private information types) (shown as a Credit Card Number), time ("When") (e.g., time that the message including the private information was sent and/or detected), location ("Where") field that indicates where the file is located (e.g., and includes a link to that file), and a Take Action field that includes a list of possible actions to be taken (e.g., taken by the administrator). In certain embodiments, a possible action is to notify the user that sent the message, e.g., by selecting the notify button 602 to cause a notification to be sent to that user (e.g., to cause the sending of chat alert 300 in FIG. 3). In certain embodiments, a possible action is causing a corrective action to be taken on the private information, e.g., by selecting the corrective action button 604 (which may have its text changed to indicate the action, e.g., "DELETE" text as one example) to cause the corrective action to be taken on the private information. Corrective action may include one or more of: quarantining the data that includes the private information, deleting the data that includes the private information, redacting the data that includes the private information, and/or changing access permission for the data that includes the private information (e.g., to prevent access to the data by certain users). A chat alert for the corrective action may be sent to the user that sent the file that included private information to alert them to the current status of that private information instance. For example, summary 600 includes history entries 606 that include a first entry 608 that indicates a notification (e.g., chat alert) was sent to user_1 (e.g., the administrator) and user_9 (e.g., the sender of the message) for that file (e.g., notifying that a suspicious file was found), and a second entry 610 that indicates a notification (e.g., chart alert) was sent to a user (e.g., the administrator) or users that the file that has private information has been deleted in this example.

Figure 7:
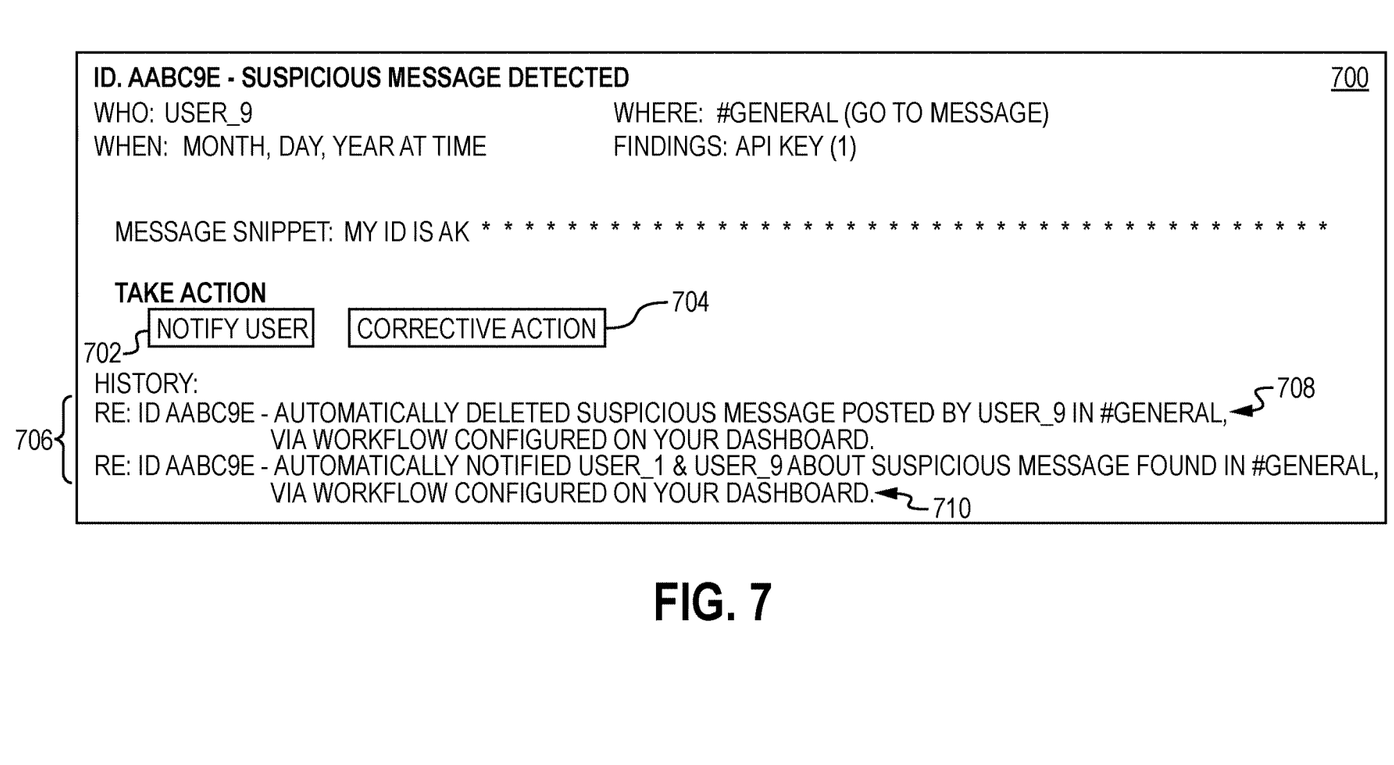
FIG. 7 is a diagram illustrating a summary that indicates chat alerts sent and corrective action taken for a transmitted message that includes private information detected by a data loss prevention service according to embodiments of the disclosure.

FIG. 7 is a diagram illustrating a summary 700 that indicates chat alerts sent and corrective action taken for a transmitted message that includes private information detected by a data loss prevention service according to embodiments of the disclosure. In one embodiment, summary 700 for chat alerts sent and corrective action taken is sent to a user (e.g., administrator) as a chat message (e.g., a chat alert that includes the information shown in FIG. 7). Summary 700 includes an ID number for the matter, the user ("Who") that transmitted the message that includes private information, a summary of findings (e.g., the type of private information, including, but not limited to, personally identifiable information, identification numbers, finance information, or other private information types) (shown as an API key), time ("When") (e.g., time that the message including the private information was sent and/or detected), location ("Where") field that indicates where the message is located (e.g., and includes a link to that message if that message is retained), an identifier (e.g., snippet) to identify the message (for example, a snippet including a redacted version of the private information that was within the message, e.g., along with some adjacent text to the private information), and a Take Action field that includes a list of possible actions to be taken (e.g., taken by the administrator). In certain embodiments, a possible action is to notify the user that sent the message, e.g., by selecting the notify button 702 to cause a notification to be sent to that user (e.g., to cause the sending of chat alert 400 in FIG. 4). In certain embodiments, a possible action is causing a corrective action to be taken on the private information, e.g., by selecting the corrective action button 704 (which may have its text changed to indicate the action, e.g., "DELETE" text as one example) to cause the corrective action to be taken on the private information. Corrective action may include one or more of: quarantining the data that includes the private information, deleting the data that includes the private information, redacting the data that includes the private information, and/or changing access permission for the data that includes the private information (e.g., to prevent access to the data by certain users). A chat alert for the corrective action may be sent to the user that sent the message that included private information to alert them to the current status of that private information instance. For example, summary 700 includes history entries 706 that include a first entry 708 that indicates a notification (e.g., chat alert) was sent to user_1 (e.g., the administrator) that the message that has private information has been deleted, and second entry 710 that indicates a notification (e.g., chat alert) was sent to user_1 (e.g., the administrator) and user_9 (e.g., the sender of the message) for that message (e.g., notifying that a suspicious message was found) in this example.

Figure 8:
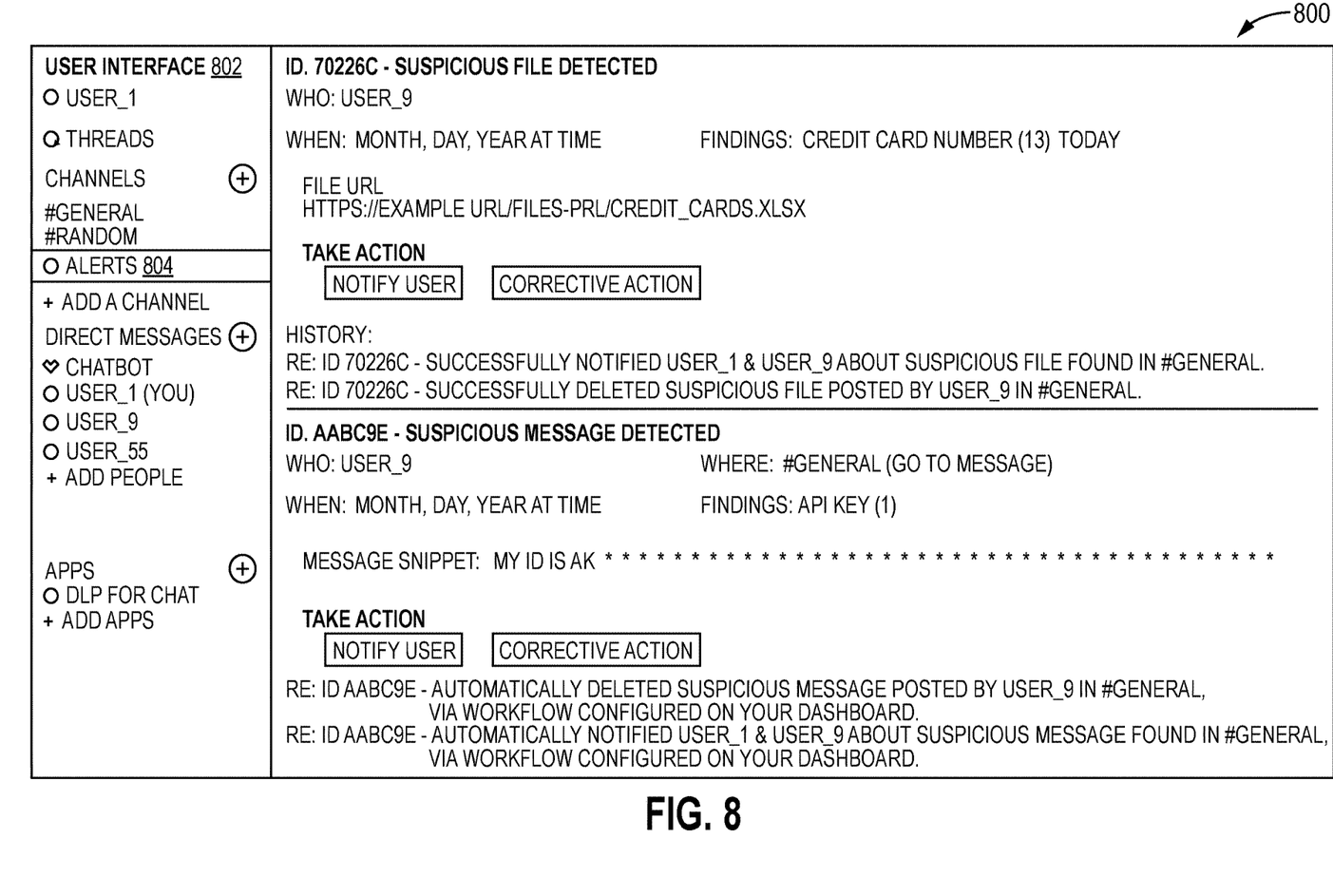
FIG. 8 is a diagram illustrating a summary history of summaries of chat alerts caused to be sent and corrective actions taken by a data loss prevention service according to embodiments of the disclosure.

FIG. 8 is a diagram illustrating a summary history 800 of summaries 600, 700 of chat alerts caused to be sent and corrective actions taken by a data loss prevention service according to embodiments of the disclosure. Summary history 800 may be displayed to an administrator, e.g., by logging into user interface 802. In one embodiment, user interface 802 is a graphical user interface of chat service 102. In one embodiment, summary history 800 displays each summary, e.g., by clicking Alerts button 804 on user interface 802.

Figure 9:
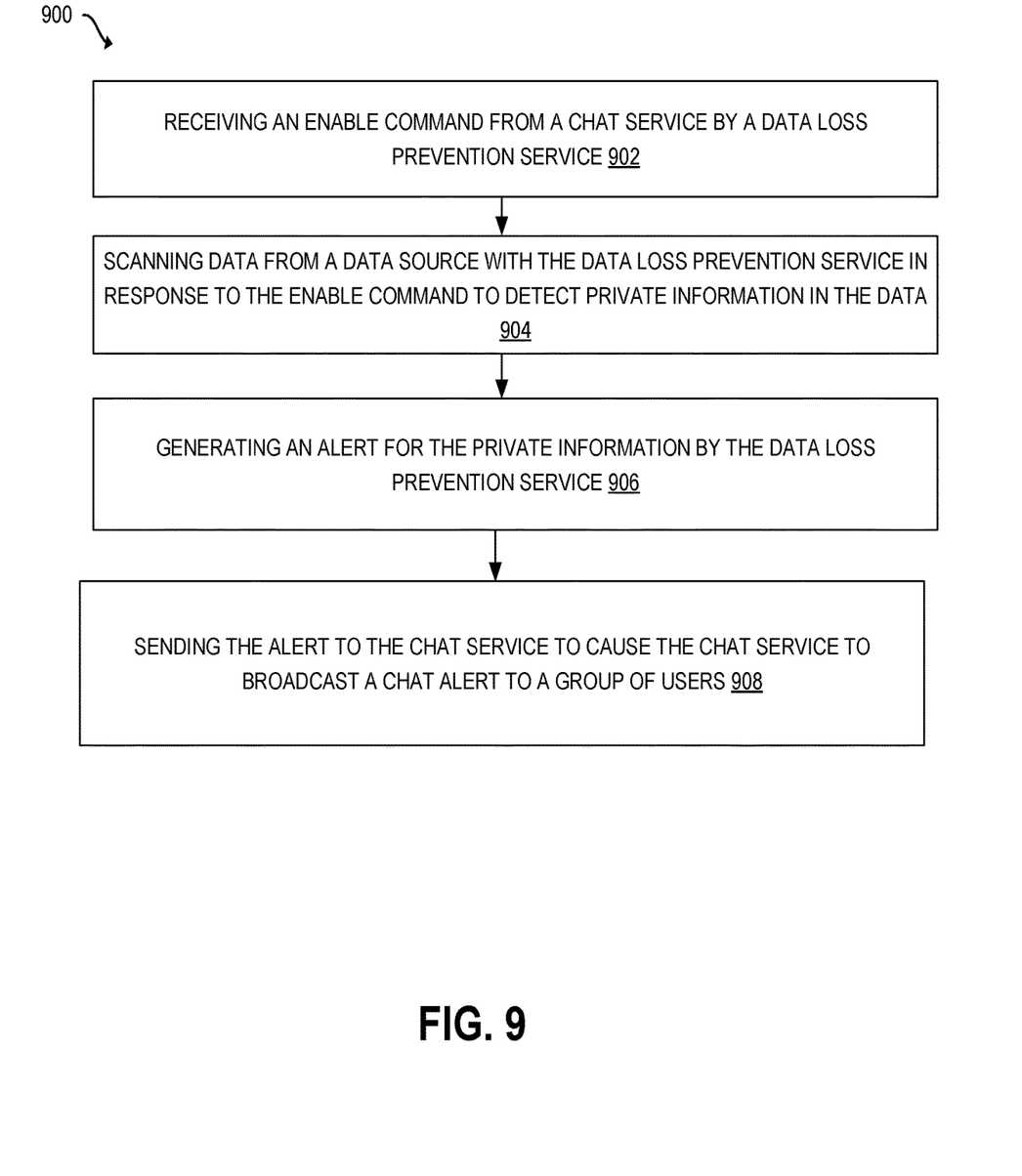
FIG. 9 illustrates a flow diagram according to embodiments of the disclosure.

FIG. 9 illustrates a flow diagram 900 according to embodiments of the disclosure. Depicted flow diagram 900 includes receiving an enable command from a chat service by a data loss prevention service 902, scanning data from a data source with the data loss prevention service in response to the enable command to detect private information in the data 904, generating an alert for the private information by the data loss prevention service 906, and sending the alert to the chat service to cause the chat service to broadcast a chat alert to a group of users 908.

Figure 10:
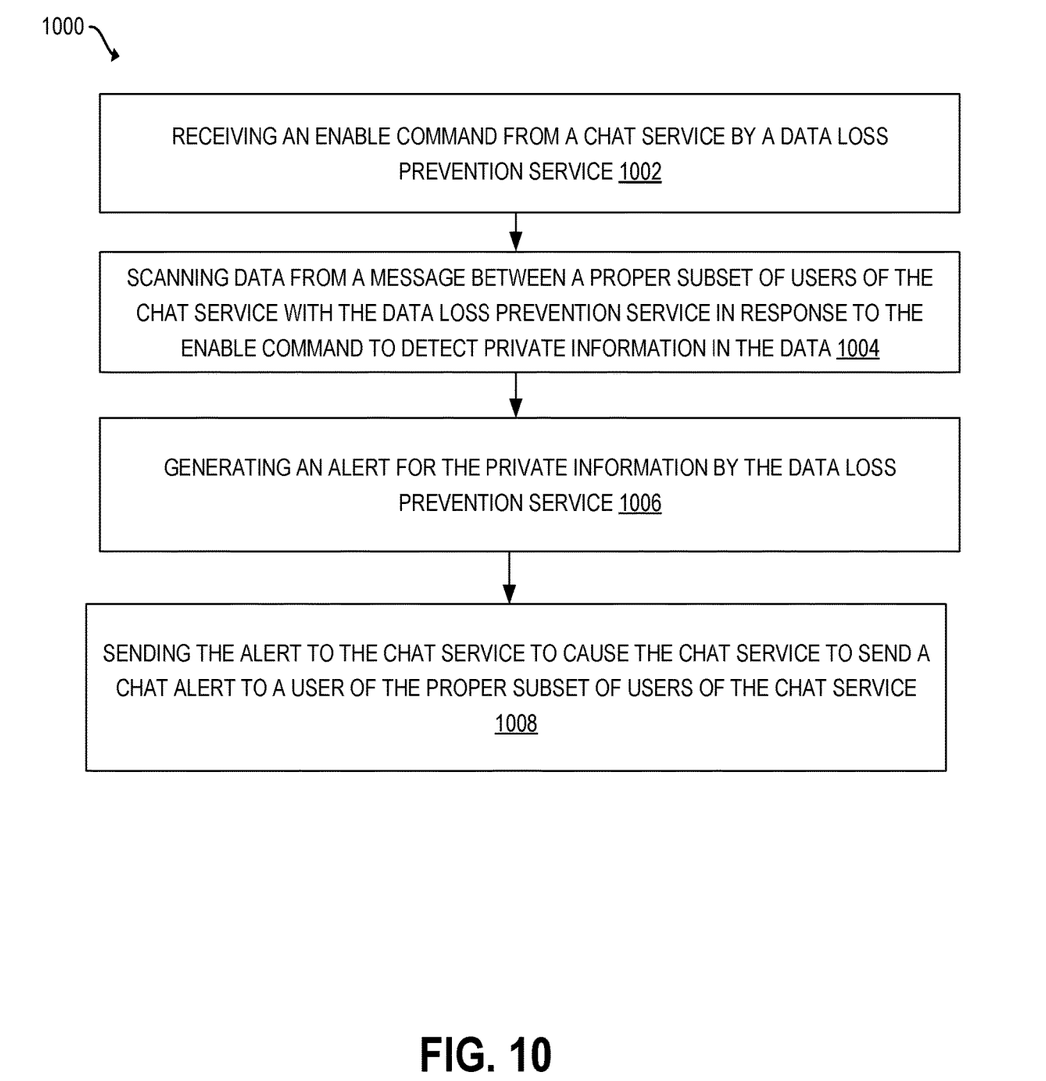
FIG. 10 illustrates a flow diagram according to embodiments of the disclosure.

FIG. 10 illustrates a flow diagram 1000 according to embodiments of the disclosure. Depicted flow diagram 1000 includes receiving an enable command from a chat service by a data loss prevention service 1002, scanning data from a message between a proper subset of users of the chat service with the data loss prevention service in response to the enable command to detect private information in the data 1004, generating an alert for the private information by the data loss prevention service 1006, and sending the alert to the chat service to cause the chat service to send a chat alert to a user of the proper subset of users of the chat service 1008.

An exemplary computing device that the above may be used in is detailed below.

Figure 11:
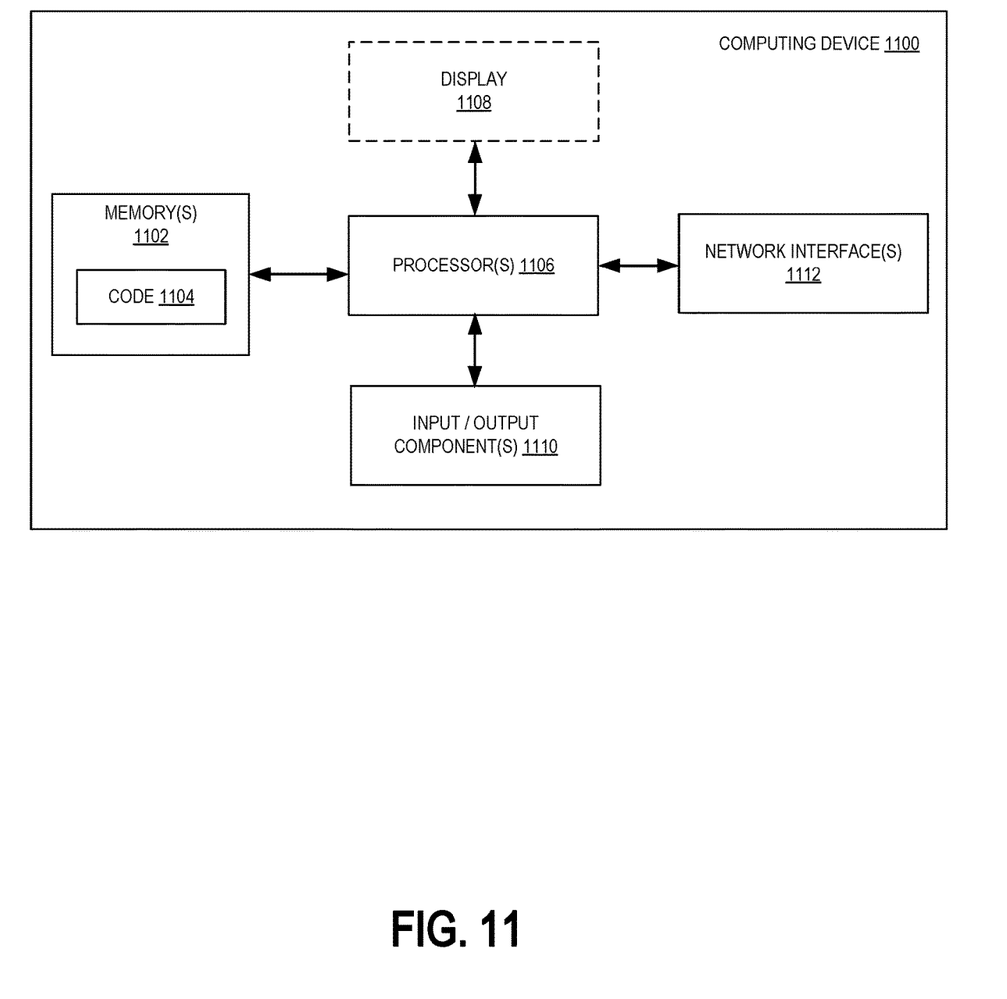
FIG. 11 illustrates an example computing device according to embodiments of the disclosure.

FIG. 11 illustrates an example computing device 1100 according to embodiments of the disclosure. Computing device 1100 includes: one or more processors 1106, one or more memories 1102 (e.g., system memory and/or cache memory), an optional display 1108 (e.g., to display any information from FIGS. 3-8), one or more input/output (I/O) components 1110, and one or more network interfaces 1112.

One or more processors 1106 execute instructions (e.g., from code 1104) to perform software routine(s) that the computing device implements. I/O components 1110 may include keyboard and pointing device (e.g., mouse), and/or device port(s). Network interfaces 1112 may include a wired or wireless connection to a network. In one embodiment, computing device implements a virtual machine instance (e.g., and a service is executed on the virtual machine instance).

At least some embodiments of the disclosed technologies can be described in view of the following examples:

Example 1. A method comprising:
receiving an enable command from a chat service by a data loss prevention service;
scanning data from a data source with the data loss prevention service in response to the enable command to detect private information in the data;
generating an alert for the private information by the data loss prevention service; and
sending the alert to the chat service to cause the chat service to broadcast a chat alert to a group of users.

Example 2. The method of example 1, further comprising selecting the group of users as a proper subset of a plurality of users of the chat service.

Example 3. The method of example 1, wherein receipt of the enable command from the chat service by the data loss prevention service causes the data loss prevention service to pull (or push) the data from the data source into the data loss prevention service.

Example 4. The method of example 1, wherein the data source is a message between users of the chat service.

Example 5. The method of example 1, wherein the chat alert comprises a graphical user interface button to cause a corrective action to be taken for the private information when selected by a user of the group of users.

Example 6. The method of example 5, wherein selection of the graphical user interface button by the user causes a notification to be sent to the group of users when the corrective action is completed.

Example 7. The method of example 1, further comprising the data loss prevention service performing a corrective action on the private information when detected, wherein the broadcast of the chat alert comprises a notification of the corrective action being sent to the group of users and a creator (or manager) of the private information.

Example 8. A non-transitory machine readable medium that stores program code that when executed by a machine causes the machine to perform a method comprising:
receiving an enable command from a chat service by a data loss prevention service;
scanning data from a data source with the data loss prevention service in response to the enable command to detect private information in the data;
generating an alert for the private information by the data loss prevention service; and
sending the alert to the chat service to cause the chat service to broadcast a chat alert to a group of users.

Example 9. The non-transitory machine readable medium of example 8, further comprising selecting the group of users as a proper subset of a plurality of users of the chat service.

Example 10. The non-transitory machine readable medium of example 8, wherein receipt of the enable command from the chat service by the data loss prevention service causes the data loss prevention service to pull (or push) the data from the data source into the data loss prevention service.

Example 11. The non-transitory machine readable medium of example 8, wherein the data source is a message between users of the chat service.

Example 12. The non-transitory machine readable medium of example 8, wherein the chat alert comprises a graphical user interface button to cause a corrective action to be taken for the private information when selected by a user of the group of users.

Example 13. The non-transitory machine readable medium of example 12, wherein selection of the graphical user interface button by the user causes a notification to be sent to the group of users when the corrective action is completed.

Example 14. The non-transitory machine readable medium of example 8, further comprising the data loss prevention service performing a corrective action on the private information when detected, wherein the broadcast of the chat alert comprises a notification of the corrective action being sent to the group of users and a creator of the private information.

Example 15. A method comprising:
receiving an enable command from a chat service by a data loss prevention service;
scanning data from a message between a proper subset of users of the chat service with the data loss prevention service in response to the enable command to detect private information in the data;
generating an alert for the private information by the data loss prevention service; and
sending the alert to the chat service to cause the chat service to send a chat alert to a user of the proper subset of users of the chat service.

Example 16. The method of example 15, wherein receipt of the enable command from the chat service by the data loss prevention service causes the data loss prevention service to pull (or push) the data from the message into the data loss prevention service.

Example 17. The method of example 15, further comprising the data loss prevention service performing a corrective action on the private information when detected, wherein the chat alert comprises a notification of the corrective action being sent to the user.

Example 18. The method of example 17, wherein the user is a sender of the message that includes the private information.

Example 19. The method of example 15, wherein the sending of the alert to the chat service further causes the chat service to send an additional chat alert to an administrator of the data loss prevention service.

Example 20. The method of example 19, wherein the additional chat alert comprises a graphical user interface button that causes a corrective action to be taken for the private information when selected by the administrator, and selection of the graphical user interface button by the administrator causes a notification to be sent to the user via the chat service when the corrective action is completed.

In yet another embodiment, an apparatus comprises a data storage device that stores code that when executed by a hardware processor causes the hardware processor to perform any method disclosed herein. An apparatus may be as described in the detailed description. A method may be as described in the detailed description.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium. Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

What is claimed is:
1. A method comprising:
receiving an enable command from a chat service by a data loss prevention service;
scanning data from a data source with the data loss prevention service in response to the enable command to detect private information in the data;

generating an alert for the private information by the data loss prevention service; and sending the alert from the data loss prevention service to the chat service to cause the chat service to broadcast a chat alert to a group of users separate from a creator of the private information, wherein the chat alert comprises a graphical user interface button to cause a corrective action to be taken by the data loss prevention service for the private information when selected by a user of the group of users without requiring the user be logged into the data loss prevention service, an identification of the creator of the private information, a location of the data that includes the private information, a type of the private information, a time and date of the private information, and a history that indicates the corrective action that was already taken.

2. The method of claim 1, further comprising selecting the group of users as a proper subset of a plurality of users of the chat service.

3. The method of claim 1, wherein receipt of the enable command from the chat service by the data loss prevention service causes the data loss prevention service to pull the data from the data source into the data loss prevention service.

4. The method of claim 1, wherein the data source is a message between users of the chat service.

5. The method of claim 1, wherein selection of the graphical user interface button by the user causes a notification to be sent to the group of users when the corrective action is begun, and the history indicates the notification.

6. The method of claim 1, wherein selection of the graphical user interface button by the user causes a notification to be sent to the group of users when the corrective action is completed, and the history indicates the notification.

7. The method of claim 6, wherein the notification is sent to the group of users and the creator of the private information.

8. A non-transitory machine readable medium that stores program code that when executed by a machine causes the machine to perform a method comprising:

receiving an enable command from a chat service by a data loss prevention service;

scanning data from a data source with the data loss prevention service in response to the enable command to detect private information in the data;

generating an alert for the private information by the data loss prevention service; and sending the alert from the data loss prevention service to the chat service to cause the chat service to broadcast a chat alert to a group of users separate from a creator of the private information, wherein the chat alert comprises a graphical user interface button to cause a corrective action to be taken by the data loss prevention service for the private information when selected by a user of the group of users without requiring the user be logged into the data loss prevention service, an identification of the creator of the private information, a location of the data that includes the private information, a type of the private information, a time and date of the private information, and a history that indicates the corrective action that was already taken.

9. The non-transitory machine readable medium of claim 8, further comprising selecting the group of users as a proper subset of a plurality of users of the chat service.

10. The non-transitory machine readable medium of claim 8, wherein receipt of the enable command from the chat service by the data loss prevention service causes the data loss prevention service to pull the data from the data source into the data loss prevention service.

11. The non-transitory machine readable medium of claim 8, wherein the data source is a message between users of the chat service.

12. The non-transitory machine readable medium of claim 8, wherein selection of the graphical user interface button by the user causes a notification to be sent to the group of users when the corrective action is begun, and the history indicates the notification.

13. The non-transitory machine readable medium of claim 8, wherein selection of the graphical user interface button by the user causes a notification to be sent to the group of users when the corrective action is completed, and the history indicates the notification.

14. The non-transitory machine readable medium of claim 13, wherein the notification is sent to the group of users and the creator of the private information.

15. A method comprising:

receiving an enable command from a chat service by a data loss prevention service;

scanning data from a message between a proper subset of users of the chat service with the data loss prevention service in response to the enable command to detect private information in the data;

generating an alert for the private information by the data loss prevention service; and sending the alert from the data loss prevention service to the chat service to cause the chat service to send a chat alert to a user of the proper subset of users of the chat service and an additional chat alert to an administrator of the data loss prevention service that is separate from the proper subset of users, wherein the additional chat alert comprises a graphical user interface button that causes a corrective action to be taken for the private information when selected by the administrator without requiring the administrator be logged into the data loss prevention service, an identification of the user, a location of the data that includes the private information, a type of the private information, a time and date of the message, and a history that indicates the corrective action that was already taken.

16. The method of claim 15, wherein receipt of the enable command from the chat service by the data loss prevention service causes the data loss prevention service to pull the data from the message into the data loss prevention service.

17. The method of claim 15, wherein the chat alert comprises a notification that the user is a recipient of the message that includes the private information, and the history of the additional chat alert indicates the notification.

18. The method of claim 15, wherein the chat alert comprises a notification that the user is a sender of the message that includes the private information, and the history of the additional chat alert indicates the notification.

19. The method of claim 15, wherein selection of the graphical user interface button by the administrator causes a notification to be sent to the user via the chat service when the corrective action is completed, and the history of the additional chat alert indicates the notification.

20. The method of claim 15, wherein selection of the graphical user interface button by the administrator causes a notification to be sent to the user via the chat service when the corrective action is begun, and the history of the additional chat alert indicates the notification.

* * * * *